United States Patent
Sun et al.

(10) Patent No.: US 12,124,964 B2
(45) Date of Patent: Oct. 22, 2024

(54) METHOD FOR UPDATING A NODE MODEL THAT RESISTS DISCRIMINATION PROPAGATION IN FEDERATED LEARNING

(71) Applicant: INSTITUTE OF AUTOMATION, CHINESE ACADEMY OF SCIENCES, Beijing (CN)

(72) Inventors: Zhenan Sun, Beijing (CN); Yunlong Wang, Beijing (CN); Zhengquan Luo, Beijing (CN); Kunbo Zhang, Beijing (CN); Qi Li, Beijing (CN); Yong He, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/732,399

(22) Filed: Jun. 3, 2024

(65) Prior Publication Data

US 2024/0320514 A1 Sep. 26, 2024

Related U.S. Application Data (63) Continuation of application No. PCT/CN2022/135819, filed on Dec. 1, 2022.

(30) Foreign Application Priority Data

Dec. 6, 2021 (CN) .......................... 202111472023.9

(51) Int. Cl.
*G06N 3/098* (2023.01)
(52) U.S. Cl.
CPC .................................. *G06N 3/098* (2023.01)

(58) Field of Classification Search
CPC ................................. G06N 3/08; G06N 3/098
See application file for complete search history.

(56) References Cited

U.S. PATENT DOCUMENTS

2021/0319258 A1   10/2021   Shen et al.

FOREIGN PATENT DOCUMENTS

| CN | 112183652 A | 1/2021 |
|---|---|---|
| CN | 112434758 A | 3/2021 |

(Continued)

OTHER PUBLICATIONS

Mugunthan et al ("Bias-Free FedGAN: A Federated Approach to Generate Bias-Free Datasets" 2021) (Year: 2021).*

(Continued)

*Primary Examiner* — Lut Wong
(74) *Attorney, Agent, or Firm* — Westbridge IP LLC (57) ABSTRACT

Disclosed is a method for updating a node model that resists discrimination propagation in federated learning. The method includes: obtaining a node model corresponding to a data node; calculating a mean value of the distribution of class features and a quantity ratio corresponding to training data of the data node, calculating a distribution weighted aggregation model based on the node model, the mean value of the distribution of class features and the quantity ratio; calculating a regularization term corresponding to the data node based on the node model and the distribution weighted aggregation model; calculating a variance of the distribution of the class features corresponding to the data node, calculating a class balanced complementary term by using a cross-domain feature generator; and updating the node model based on the distribution weighted aggregation model, the regularization term, and the class balanced complementary term.

7 Claims, 3 Drawing Sheets

(56) References Cited

FOREIGN PATENT DOCUMENTS

| CN | 112906911 A | 6/2021 |
| CN | 112949837 A | 6/2021 |
| CN | 113326949 A | 8/2021 |
| CN | 113435537 A | 9/2021 |
| CN | 113902131 A | 1/2022 |
| WO | 2021208721 A1 | 10/2021 |

OTHER PUBLICATIONS

Ferraguig (Survey of Bias Mitigation in Federated Learning 2021) (Year: 2021).*
Chu et al (FedFair: Training Fair Models In Cross-Silo Federated Learning (Year: 2021).*
Abay et al., Mitigating Bias in Federated Learning, arXiv: 2012.02447v1, 2020, pp. 1-16, dated Nov. 4, 2020.
First Office Action issued in counterpart Chinese Patent Application No. 202111472023.9, dated Jan. 18, 2022.
International Search Report and Written Opinion issued in corresponding PCT Application No. PCT/CN2022/135819, dated Feb. 14, 2023.
Notification to Grant Patent Right for Invention issued in counterpart Chinese Patent Application No. 202111472023.9, dated Feb. 12, 2022.

* cited by examiner

METHOD FOR UPDATING A NODE MODEL THAT RESISTS DISCRIMINATION PROPAGATION IN FEDERATED LEARNING

CROSS-REFERENCE TO RELATED APPLICATIONS

This application is a continuation of International Application No. PCT/CN2022/135819, filed on Dec. 1, 2022, which claims priority to Chinese Patent Application 202111472023.9, entitled "Method for updating a node model that resists discrimination propagation in federated learning", filed on Dec. 16, 2021. All of the aforementioned applications are incorporated herein by reference in their entireties.

TECHNICAL FIELD

The present application relates to the field of artificial intelligence and, in particular, to a method for updating a node model that resists discrimination propagation in federated learning.

BACKGROUND

In federated learning, personalized federated learning focuses more on the role of the trained model on the overall performance improvement of the task, and does not devote much attention to performance variance or data discrimination. At the same time there is no corresponding solution to the propagation of discrimination introduced by the introduction of too many idiosyncratic data models. Bias transfer is a localized performance degradation or deviation due to the large difference in the data distribution of the interacting nodes or the special properties of their data. Federated learning refers to a distributed learning scheme that does not touch the raw data of the participating learning nodes.

In the course of realizing the idea of this application, the inventor found at least the following technical problems in the related art: the lack of a solution to the problem of discrimination propagation in federated learning.

SUMMARY

In order to solve the above technical problems or at least partially address the above technical problems, embodiments of this application provide a method for updating a node model that resists discrimination propagation in federated learning to solve, at least in the prior art, the lack of a scheme to address discrimination propagation in federated learning.

The purpose of this application is achieved through the following technical solutions:

In a first aspect, an embodiment of this application provides a method for updating a node model that resists discrimination propagation in federated learning, including: obtaining a node model corresponding to a data node; calculating a mean value of the distribution of class features and a quantity ratio corresponding to training data of the data node, and calculating a distribution weighted aggregation model based on the node model, the mean value of the distribution of class features and the quantity ratio; calculating a regularization term corresponding to the data node based on the node model and the distribution weighted aggregation model; calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features; updating the node model based on the distribution weighted aggregation model, the regularization term, and the class balanced complementary term.

In an exemplary embodiment, calculating the mean value $\mu_i^c$ of the distribution of class features, the quantity ratio $\omega_i^c$ and the variance $\sigma_i^c$ of the distribution of the class features corresponding to the data node, includes:

$$\mu_i^c = \frac{\sum_{(x_i^j, y_i^j) \in D_i, y_i^j = c} f(x_i^j, \theta_i^E)}{\sum_{(x_i^j, y_i^j) \in D_i} 1(y_i^j = c)}$$

$$\omega_i^c = \frac{\sum_{(x_i^j, y_i^j) \in D_i} 1(y_i^j = c)}{n_i}$$

$$\sigma_i^c = \frac{1}{n_i - 1} \sum_{(x_i^j, y_i^j) \in D_i, y_i^j = c} (x_i^j - \rho_i^c)^T (x_i^j - \mu_i^c)$$

where, $\mu_i^c$ is the mean value of the distribution of class features, $\omega_i^c$ is the quantity ratio, and $\sigma_i^c$ is the variance of the distribution of the class features, i is a serial number of the data node, j is a serial number of a class of sample data of the data node, the node model includes: a feature extraction module $f_E$ and a prediction module $f_P$, the corresponding model parameters of the feature extraction module $f_E$ and the prediction module $f_P$ of the ith node model are $\theta_i^E$ and $\theta_i^P$ respectively, $x_i^j$ is an input vector of the jth sample data for the ith data node, $y_i^j$ is an output vector of the jth sample data of the ith data node, f( ) is a function corresponding to the node model, l( ) is a loss function corresponding to the node model, $n_i$ is all the sample data the ith node model has, and T denotes a total number of training epochs, $D_i$ is the training dataset for node i, $y_i^j = c$ indicates that the selected sample data all belongs to the data under sample class c, and the sample data has a plurality of sample classes.

In an exemplary embodiment, calculating the distribution weighted aggregation model based on the node model, the mean value of the distribution of class features and the quantity ratio includes: calculating distribution similarity distances between the data node and other data nodes correspondingly based on the mean value of the distribution of class features and the quantity ratio; selecting a first predetermined number of node models from a plurality of node models corresponding to a plurality of data nodes, and calculating a distribution weighted aggregation model based on the distribution similarity distances and the first predetermined number of node models.

In an exemplary embodiment, calculating the distribution similarity distances corresponding to the data node based on the mean value of the distribution of class features and the quantity ratio includes:

defining $d_{ij} = \|\mu_P^i - \mu_Q^j\|$ as the distance from the ith sample data of data node P to the jth sample data of data node Q;

defining $f_{ij}$ conforming to the following formulas:

$$\min \sum_{i=1}^{n_P} \sum_{j=1}^{n_Q} d_{ij}, f_{ij};$$

$$f_{ij} \geq 0, \sum_{i=1}^{n_P} f_{ij} \leq \omega_Q^j, \sum_{j=1}^{n_Q} f_{ij} \leq \omega_P^i;$$

$$\sum_{i=1}^{n_P} \sum_{j=1}^{n_Q} f_{ij} = \min\left\{\sum_{i=1}^{n_P} \omega_P^i, \sum_{j=1}^{n_Q} \omega_Q^j\right\};$$

calculating the distribution similarity distance EMDPQ from the ith sample data of data node P to the jth sample data of data node Q by the following formula:

$$EMD_{PQ} = \frac{\sum_{i=1}^{n_P} \sum_{j=1}^{n_Q} d_{ij} f_{ij}}{\sum_{i=1}^{n_P} \sum_{j=1}^{n_Q} f_{ij}};$$

wherein, $n_P$ and $n_Q$ are all the sample data the Pth data node and the Qth data node have respectively, $\omega_Q^j$ is the quantity ratio of the jth sample data of the Qth data node, $\omega_P^i$ is the quantity ratio of the ith sample data of the Pth data node, $\mu_P^i$ is the mean value of the distribution of the class features of the ith sample data of the Pth data node, $\mu_Q^j$ is the mean value of the distribution of class features of the jth sample data of the Qth data node, $\|\ \|$ denotes the two-norm operation.

In an exemplary embodiment, selecting the first predetermined number of node models from the plurality of node models corresponding to the plurality of data nodes, and calculating the distribution weighted aggregation model based on the distribution similarity distances and the first predetermined number of node models, includes:

calculating the distribution weighted aggregation model $\theta_i^G$ corresponding to the ith data node is computed by the following formula:

$$\theta_i^G = \lambda \theta_i + (1 - \lambda) \sum_{j \in [K], j \neq i} \frac{EMD_{ji}}{\sum_{j \in [K], j \neq i} EMD_{ji}} \theta_j$$

wherein, $\lambda$ is a constant, $\theta_i$ is the model parameter corresponding to the ith node model, $\theta_j$ is the model parameter corresponding to the jth node model, EMDji is the distribution similarity distances corresponding to the ith data node and the jth data node, and K is the first predetermined number.

In an exemplary embodiment, calculating the regularization term corresponding to the data node based on the node model and the distribution weighted aggregation model includes:

calculating the regularization term corresponding to the ith data node in the t+1st update by the following formula, $$\theta_i^{(t+1)} = \theta_j^G;$$

$$R(\theta_i^{(t+1)}) = \frac{1}{2} \|\theta_i^{(t+1)} - \theta_i^{(t)}\|;$$

wherein, $\theta_i^G$ is the distribution weighted aggregation model corresponding to the ith data node, $\theta_i^{(t+1)}$ is the node model in the t+1st update corresponding to the ith data node, $\theta_i^{(t)}$ is the node model in the tth update corresponding to the ith data node, $\|\ \|$ denotes the two-norm operation.

In an exemplary embodiment, calculating the class balanced complementary term corresponding to the data node by using the cross-domain feature generator based on the mean value of the distribution of class features and the variance of the distribution of the class features includes:

calculating the class balanced complementary term $G(\theta_i^P)$ corresponding to the ith data node by the following formula, $$G(\theta_i^P) = \hat{E}_{y \sim \hat{p}(y)} \frac{1}{K} \sum_{i=1}^{K} W_{z \sim G_\Psi(z|y, \xi \sim N(\mu_i^y, \sigma_i^y))} [l_i(f_P(z, \theta_i^P), y)]$$

wherein z is the eigenvector of the input vectors of the data nodes other than the ith data node, y is the output vectors of the data nodes other than the ith data node, li( ) is the loss function corresponding to the node model of the ith data node, $\mu_i^y$ is the mean value of the distribution of class features of the ith data node with respect to the output vector y, $\sigma_i^y$ is the variance of the class feature distribution of the ith data node with respect to the output vector y, K is a first predetermined number, $\theta_i^P$ is the model parameter corresponding to the prediction module fP of the model of the ith node, fP( ) is the function corresponding to the prediction module fP of the node model, y~p̂(y) denotes that y satisfies p̂(y) distribution, z~$G_\Psi$(z|y, $\xi$~N($\mu_i^y, \sigma_i^y$)) denotes that Z satisfies $G_\Psi$( ) distribution, N( ) is a normal distribution, E[ ] denotes the actual mean value when the data point samples conform to the true distribution, Ê denotes that the estimated mean value calculated from some of the data point samples, ε is a parameter of the cross-domain feature generator, and the data point samples includes an eigenvector z and an output vector y.

In an exemplary embodiment, after obtaining the node model corresponding to the data node, the method further includes: initializing all the node models and confirming the node data corresponding to each data node, executing the following cycle: Step 1: determining a current epoch, and executing Step 2 when the current epoch is smaller than or equal to a first preset epoch, and executing Step 8 when the current epoch is greater than the first preset epoch; Step 2: determining a node model corresponding to a second predetermined number of data nodes from all the data nodes; Step 3: calculating the mean value of the distribution of class features and the quantity ratio corresponding to each data node, and calculating the distribution weighted aggregation model corresponding to each data node based on the node model, the mean value of the distribution of class features and the quantity ratio corresponding to each data node; Step 4: updating the node model corresponding to each data node by using the distribution weighted aggregation model corresponding to each data node; Step 5: calculating the regularization term corresponding to each data node based on the node model and the distribution weighted aggregation model corresponding to each data node; Step 6: calculating a variance of the distribution of the class features corresponding to each data node, and calculating a class balanced complementary term corresponding to each data node by using a cross-domain feature generator corresponding to each data node based on the mean value of the distribution of the class features and the variance of the distribution of the class features corresponding to each data node; Step 7: obtaining generator data corresponding to the cross-domain feature generator corresponding to each data node, updating the node model corresponding to each data node by using a model optimization formula based on the node data and the generator data corresponding to each data node, and updating the current epoch with the value of the current epoch plus one, performing Step 2 when the current epoch is smaller than or equal to the first preset epoch, and performing Step 8 when the current epoch is greater than the first preset epoch, wherein the number of epochs to update the node model corresponding to each data node is a second preset epoch; and Step 8: updating the cross-domain feature generator corresponding to each data node according to the generator optimization formula, and ending the loop.

In an exemplary embodiment, the model optimization formula includes:

$$\theta_i^{(t+1)} = \theta_i^{(t+1)} - \eta \nabla_{\theta_i^{(t+1)}} H(\theta_i^{(t+1)})$$

$$J(\theta_i^{(t+1)}) =$$

$$L_i(\theta_i^{(t+1)}) + \alpha R(\theta_i^{(t+1)}) + \beta G(\theta_i^{P(t+1)}) = \frac{1}{n_i}\sum_{j=1}^{n_j} l_i(f_P(f_E(x_i^j, \theta_i^{E(t+1)}), \theta_i^{P(t+1)}), y_i^j) +$$

$$\frac{\alpha}{2}\|\theta_i^{(t+1)} - \theta_i^{(t)}\| + \beta \hat{E}_{y \sim \hat{p}(y)} \frac{1}{K} \sum_{i=1}^{K} E_{z \sim G_\psi(z|y, \xi \sim N(\mu_i^y, \sigma_i^y))}[l_i(f_P(z, \theta_i^{P(t+1)}), y)]$$

$$L_i(\theta_i) = \frac{1}{n_i}\sum_{j=1}^{n_i} l_i(x_i^j, y_i^j, \theta_i) = \frac{1}{n_i}\sum_{j=1}^{n_i} l_i(f_P(f_E(x_i^j, \theta_i^E), \theta_i^P), y_i^j)$$

Where A, $\theta_i^{(t+1)}$ is the node model in the t+1st update corresponding to the ith data node, $\theta_i^{(t)}$ is the node model in the tth update corresponding to the ith data node, $\eta$ is a learning rate of the node model, $\nabla_{\theta_i^{(t+1)}} J(\theta_i^{(t+1)})$ is a derivative of $\theta_i^{(t+1)}$ with respect to $J(\theta_i^{(t+1)})$, $L_i(\theta_i^{(t+1)})$ is an optimization function with respect to $\theta_i^{(t+1)}$, $R(\theta_i^{(t+1)})$ is the regularization term corresponding to the ith data node in the t+1st update, $G(\theta_i^{P(t+1)})$ is the class balanced complementary term in the t+1st update corresponding to the ith data node, $\alpha$ is the learning rate of the cross-domain feature generator, ni is all the sample data the ith node model has, $f_E(\ )$ and $f_P(\ )$ are respectively the functions corresponding to the feature extraction module $f_E$ and the prediction module $f_P$ of the node model, the functions $\theta_i^{E(t+1)}$ and $\theta_i^{P(t+1)}$ are respectively parameters of the feature extraction module $f_E$ and the prediction module $f_P$ in the t+1st update corresponding to the ith data node, K is a first predetermined number, z is the eigenvector of the input vector of data nodes other than the ith data node, y is an output vector of data nodes other than the ith data node, $l_i(\ )$ is a loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, $x_i^j$ is the input vector of the jth sample data for the ith data node, $y_i^j$ is the output vector of the jth sample data for the ith data node, $y \sim \hat{p}(y)$ denotes that y satisfies $\hat{p}(y)$ distribution, $z \sim G_\psi(z|y, \xi \sim N(\mu_i^y, \sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample includes an eigenvector z and an output vector y, and $\beta$ is a hyper-parameter of the cross-domain feature generator.

In an exemplary embodiment, the generator optimization formula is:

$$\min_\psi J(\psi) = E_{y \sim \hat{p}(y)} \frac{1}{K} \sum_{i=1}^{K} E_{z \sim G(z|y, \xi \sim N(\mu_i^y, \sigma_i^y))}[l_i(h(f_P(z, \theta_i^P), y))]$$

wherein $J(\psi)$ is the generator, $h(\ )$ is a nonlinear activation function, z is the eigenvector of the input vectors of the data nodes other than the ith data node, y is the output vector of the data nodes other than the ith data node, $l_i(\ )$ is the loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, K is a first predetermined number, $\theta_i^P$ is the model parameter corresponding to prediction module $f_P$ of the ith node model, $f_P(\ )$ is the function corresponding to prediction module $f_P$ of the node model, $y \sim \hat{p}(y)$ denotes that y satisfies $\hat{p}(y)$ distribution, $z \sim G(z|y, \xi \sim N(\mu_i^y, \sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample includes an eigenvector z and an output vector y. In an exemplary embodiment, In an exemplary embodiment, In a second aspect, an embodiment of this application provides an apparatus for updating a node model that resists discrimination propagation in federated learning, the apparatus includes: an obtaining module, configured for obtaining a node model corresponding to a data node; a first calculation module, configured for calculating a mean value of the distribution of class features and a quantity ratio corresponding to training data of the data node, and calculating a distribution weighted aggregation model based on the node model, the mean value of the distribution of class features and the quantity ratio; a second calculation module, configured for calculating a regularization term corresponding to the data node based on the node model and the distribution weighted aggregation model; a third calculation module, configured for calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features; an update module, configured for updating the node model based on the distribution weighted aggregation model, the regularization term, and the class balanced complementary term.

In a third aspect, an embodiment of this application provides an electronic device, the electronic device includes a processor, a communication interface, a memory, and a communication bus, where the processor, the communication interface, and the memory communicate with each other via the communication bus; the memory is configured for storing a computer program; and the processor is configured for implementing the method for updating a node model when executing the program stored on the memory.

In a fourth aspect, an embodiment of this application provides a non-transitory computer-readable storage medium having computer programs stored thereon, where the computer programs, when being executed by a processor, implement the method for updating a node model.

The above technical solution provided in embodiment this application has at least some or all of the following advantages over the prior art: obtaining a node model corresponding to a data node; calculating a mean value of the distribution of class features and a quantity ratio corresponding to training data of the data node, and calculating a distribution weighted aggregation model based on the node model, the mean value of the distribution of class features and the quantity ratio; calculating a regularization term corresponding to the data node based on the node model and the distribution weighted aggregation model; calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features; updating the node model based on the distribution weighted aggregation model, the regularization term, and the class balanced complementary term. Since the embodiments of the this application can compute the distribution weighted aggregation model, the regularization term, and the class balanced complementary term, and update the node model based on the distribution weighted aggregation model, the regularization term, and the class balanced complementary term, the problem of the lack of a solution to address the propagation of discrimination in federated learning in the prior art can be solved by adopting the above technical means.

BRIEF DESCRIPTION OF THE DRAWINGS

The accompanying drawings herein are incorporated into and form a part of the specification, illustrate embodiments consistent with the present application, and are used in conjunction with the specification to explain the principles of the present application.

In order to more clearly illustrate the technical solutions in this application embodiments or the prior art, the accompanying drawings to be used in the embodiments or related technical descriptions will be briefly described below, and it will be obvious to a person of ordinary skill in the art that other accompanying drawings can be obtained on the basis of these drawings without creative effort.

DETAILED DESCRIPTION OF THE EMBODIMENTS

The present application will be described in detail below with reference to the accompanying drawings and in conjunction with embodiments. It should be noted that the embodiments in this application and the features in the embodiments may be combined with each other without conflict.

It should be noted that the terms "first", "second", etc. in the specification and claims of this application and the above-mentioned accompanying drawings are used to distinguish similar objects, and need not be used to describe a particular order or sequence.

Figure 1:
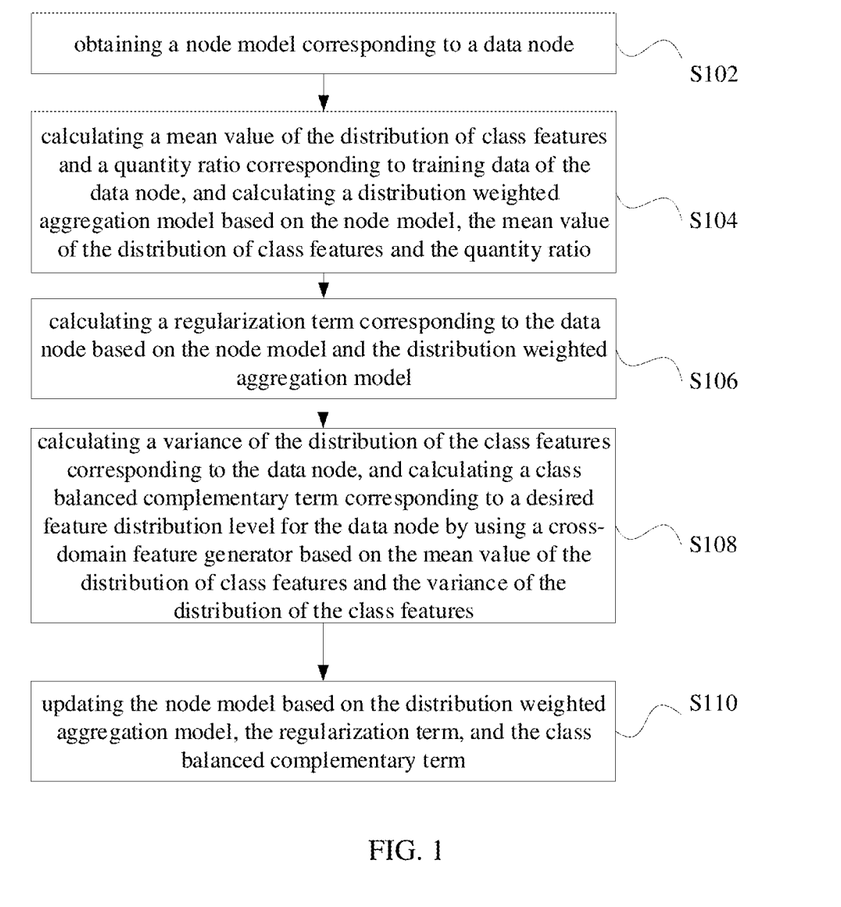
FIG. 1 schematically illustrates a flowchart of a method for updating a node model that resists discrimination propagation in federated learning according to the embodiments of this application.

In the embodiment of this application, a method for updating a node model that resists discrimination propagation in federated learning is provided, and FIG. 1 schematically illustrates a flowchart of a method for updating a node model that resists discrimination propagation in federated learning according to the embodiment of this application, which, as shown in FIG. 1, includes the following steps:

Step S102, obtaining a node model corresponding to a data node;

Step S104, calculating a mean value of the distribution of class features and a quantity ratio corresponding to training data of the data node, and calculating a distribution weighted aggregation model based on the node model, the mean value of the distribution of class features and the quantity ratio;

Step S106, calculating a regularization term corresponding to the data node based on the node model and the distribution weighted aggregation model;

Step S108, calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features;

Step S110, updating the node model based on the distribution weighted aggregation model, the regularization term, and the class balanced complementary term.

Since the embodiment of this application can compute the distribution weighted aggregation model, the regularization term, and the class balanced complementary term, and update the node model based on the distribution weighted aggregation model, the regularization term, and the class balanced complementary term, the problem of the lack of a solution to address the propagation of discrimination in federated learning in the prior art can be solved by adopting the above technical means.

Embodiments of the present application utilize an adversarial weak discrimination knowledge extraction method and a model aggregation scheme with complementary weighting of class performance to eliminate discrimination propagation and mitigate model discrimination by mitigating differences in model performance across classes while ensuring performance gains.

In the field of biometrics, since different datasets have large differences in the data collected at the time of collection regarding ethnicity, gender, and age distribution, with these datasets with data bias, when trained jointly, the node model will learn discriminatory parameters and such discrimination will spread along the nodes in joint learning thus destroying the fairness of other nodes. Thus discrimination propagation is very prominent in the field of biometrics. The method for updating a node model proposed in embodiments of the present application can be applied to biometric identification, where there are large differences in the data collected at the time of acquisition of data sets from different device regions with respect to the distribution of human races, genders, and ages, effectively overcoming the propagation of the performance discrimination caused by such differences in distribution training, and mitigating the impact of the discrimination on the performance of each data nodes.

In an optional embodiment, calculating a mean value of the distribution of class features, a quantity ratio, and a variance of the distribution of the class features corresponding to the data node includes:

$$\mu_i^c = \frac{\sum_{(x_i^j, y_i^j) \in D_i, y_i^j = c} f(x_i^j, \theta_i^E)}{\sum_{(x_i^j, y_i^j) \in D_i} 1(y_i^j = c)}$$

$$\omega_i^c = \frac{\sum_{(x_i^j, y_i^j) \in D_i} 1(y_i^j = c)}{n_i}$$

$$\sigma_i^c = \frac{1}{n_i - 1} \sum_{(x_i^j, y_i^j) \in D_i, y_i^j = c} (x_i^j - \rho_i^c)^T (x_i^j - \mu_i^c)$$

where, $\mu_i^c$ it is the mean value of the distribution of class features, $\omega_i^c$ is the quantity ratio, and $\sigma_i^c$ is the variance of the distribution of the class features, i is a serial number of the data node, j is a serial number of a class of sample data of the data node, the node model includes: a feature extraction module $f_E$ and a prediction module $f_P$, the corresponding model parameters of the feature extraction module $f_E$ and the prediction module $f_P$ of the ith node model, respectively, are $\theta_i^E$ and $\theta_i^P$, where $x_i^j$ is an input vector of the jth sample data for the ith data node, $y_i^j$ is an output vector of the jth sample data of the ith data node, f( ) is a function corresponding to the node model, l( ) is a loss function corresponding to the node model, $n_i$ is all the sample data the ith node model has, and T denotes a total number of training epochs, $D_i$ is the training dataset for node i, $y_i^j = c$ indicates that the selected sample data all belongs to the data under sample class c. The sample data has a plurality of sample classes.

It should be noted that because the present application involves a large number of calculations based on mathematical principles, a large number of typed characters are used, which may cause the same character to denote different meanings in different embodiments. For example, i denotes the meaning of the first few in different embodiments, but denotes different objects, because mathematically, i can or often does denote the meaning of different objects being the first few in the same calculation, so the present application's use of characters is identical to the mathematical convention of character representation, and at the same time, the various characters are clear in their respective contexts.

$x_i^j$ is the input vector of the jth sample data of the ith data node. $y_i^j$ is the output vector of the jth sample data of the ith data node. $(x_i^j, y_i^j) \in D_i$ denotes a piece of data, which is the jth sample data of the ith data node, in the training dataset $D_i$.

In step S104, calculating a distribution weighted aggregation model based on the node model, the mean value of the distribution of class features, and the quantity ratio, including: calculating, based on the mean value of the distribution of class features and the quantity ratio, distribution similarity distances between the data node and other data nodes correspondingly; selecting a first predetermined number of node models from a plurality of node models corresponding to a plurality of data nodes, and calculating a distribution weighted aggregation model based on the distribution similarity distances and the first predetermined number of node models.

Embodiments of the present application disclosed a method for model aggregation based on distribution similarity weighting, eliminating the situation where a single global aggregation model of a federated model cannot effectively deal with the differentiated distribution of node data, and by providing each node with a differentiated aggregation model more in line with its own distribution requirements, effectively improving node performance while meeting individualized needs and mitigating the fact that a node with too large a distribution difference introduces serious discrimination propagation.

In step S104, calculating the distribution similarity distances corresponding to the data node based on the mean value of the distribution of class features and the quantity ratio, including:

defining $d_{ij} = \|\mu_P^i - \mu_Q^j\|$ as the distance from the ith sample data of data node P to the jth sample data of data node Q;

defining $f_{ij}$ conforming to the following formulas:

$$\min \sum_{i=1}^{n_P} \sum_{j=1}^{n_Q} d_{ij}, f_{ij};$$

$$f_{ij} \geq 0, \sum_{i=1}^{n_P} f_{ij} \leq \omega_Q^j, \sum_{j=1}^{n_Q} f_{ij} \leq \omega_P^i;$$

$$\sum_{i=1}^{n_P} \sum_{j=1}^{n_Q} f_{ij} = \min\left\{\sum_{i=1}^{n_P} \omega_P^i, \sum_{j=1}^{n_Q} \omega_Q^j\right\};$$

The distribution similarity distance $EMD_{PQ}$ from the ith sample data of data node P to the jth sample data of data node Q is calculated by the following formula:

$$EMD_{PQ} = \frac{\sum_{i=1}^{n_P} \sum_{j=1}^{n_Q} d_{ij} f_{ij}}{\sum_{i=1}^{n_P} \sum_{j=1}^{n_Q} f_{ij}};$$

where, $n_P$ and $n_Q$ are all the sample data that the Pth data node and the Qth data node has, respectively. $\omega_Q^j$ is the quantity ratio of the jth sample data of the Qth data node. $\omega_P^i$ is the quantity ratio of the ith sample data of the Pth data node. $\mu_P^i$ is the mean value of the distribution of class features of the ith sample data of the Pth data node. $\mu_Q^j$ is the mean value of the distribution of class features of the jth sample data of the Qth data node, $\|\ \|$ denotes the two-norm operation.

$d_{ij}=\|\mu_P^i-\mu_Q^j\|$ is the distance from the ith sample data of data node P to the jth sample data of data node Q. It can be understood as the distance from the center of the ith class of node P to the center of the jth class of node Q.

In step S104, a first predetermined number of node models are selected from the plurality of node models corresponding to the plurality of data nodes, and a distribution weighted aggregation model is calculated based on the distributional similarity distance and the first predetermined number of node models, including:

The distribution weighted aggregation model $\theta_i^G$ corresponding to the ith data node is computed by the following formula:

$$\theta_i^G = \lambda\theta_i + (1-\lambda)\sum_{j\in[K],j\neq i}\frac{EMD_{ji}}{\sum_{j\in[K],j\neq i}EMD_{ji}}\theta_j;$$

where $\lambda$ is a constant, $\theta_i$ is the model parameter corresponding to the ith node model, $\theta_j$ is the model parameter corresponding to the jth node model. $EMD_{ji}$ is the distribution similarity distance between the ith data node and the jth data node corresponding to the jth data node, and K is a first predetermined number.

In step S106, calculating a regularization term corresponding to the data node based on the node model and the distribution weighted aggregation model, including:

The regularization term $R(\theta_i^{(t+1)})$ corresponding to the ith data node in the t+1st update is calculated by the following formula:

$$\theta_i^{(t+1)} = \theta_i^G;$$

$$R(\theta_i^{(t+1)}) = \frac{1}{2}\|\theta_i^{(t+1)} - \theta_i^{(t)}\|;$$

where, $\theta_i^G$ is the distribution weighted aggregation model corresponding to the ith data node, $\theta_i^{(t+1)}$ is the node model in the t+1st update corresponding to the ith data node, $\theta_i^{(t)}$ is the node model in the tth update corresponding to the ith data node.

$\|\ \|$ denotes the operation of finding a two-norm number.

An embodiment of the present application includes adding a regularization term to a model update, which can effectively control the node model to be closer to the node distribution itself when updating, eliminating the model bias brought about by the difference between the potential distribution of the data corresponding to the aggregation model and the required data distribution of the node, and effectively mitigating the discrimination propagation that may be introduced by the potential aggregated distribution.

In step S108, calculating a class balanced complementary term corresponding to the data node by using a cross-domain feature generator based on the mean value of the distribution of class features and the variance of the distribution of the class features, including:

calculating the class balanced complementary term $G(\theta_i^P)$ corresponding to the ith data node by the following formula:

$$G(\theta_i^p) = \hat{E}_{y\sim\hat{p}(y)}\frac{1}{K}\sum_{i=1}^{K}E_{z\sim G_\Psi(z|y,\xi\sim N(\mu_i^y,\sigma_i^y))}[l_i(f_P(z,\theta_i^p),y)]$$

where z is the eigenvector of the input vectors of the data nodes other than the ith data node, y is the output vectors of the data nodes other than the ith data node, $l_i(\ )$ is the loss function corresponding to the node model of the ith data node. $\mu_i^y$ is the mean value of the distribution of class features of the ith data node with respect to the output vector y, $\sigma_i^y$ is the variance of the class feature distribution of the ith data node with respect to the output vector y, K is a first predetermined number, and $\theta_i^P$ is the model parameter corresponding to the prediction module $f_P$ of the model of the ith node. $f_P(\ )$ is the function corresponding to the prediction module $f_P$ of the node model $y\sim\hat{p}(y)$ denotes that y satisfies $\hat{p}(y)$ distribution. $z\sim G_\Psi(z|y,\ \xi\sim N(\mu_i^y,\sigma_i^y))$ denotes that Z satisfies $G_\Psi(\ )$ distribution. $N(\ )$ is a normal distribution. $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample consist of an eigenvector z and an output vector y.

Since $G_\Psi(\ )$ distribution, $\hat{p}(y)$ distribution and the true distribution are all mathematical distributions commonly used in the field and will not be explained further. $\hat{E}$ denotes an estimated mean calculated from part of the data points samples, where part of the data points samples used by $\hat{E}$ also satisfies the true distribution, and $\varepsilon$ is a parameter of the cross-domain feature generator, and $\varepsilon$ is used in calculating, by the cross-domain feature generator, the class balanced complementary term corresponding to the feature distribution level desired by the data node.

An embodiment of the present application is a lightweight class-distributed sampling based cross-domain feature generator, which updates the node model based on the computed class balanced complementary term, complementarily generating the inter-class performance discrimination that may be caused by the imbalance of node classes and the variability of the inter-class data distribution, and at the same time, by complementing sufficient amount of feature point, the node inter-class performance discrimination due to the skewed data (the amount of data of part of the classes is insufficient) can be effectively improved.

After step S102, that is, after obtaining a node model corresponding to a data node, the method further includes: initializing all the node models and confirming the node data corresponding to each data node, executing the following cycle: Step 1: determining a current epoch, and executing Step 2 when the current epoch is smaller than or equal to a first preset epoch, and executing Step 8 when the current epoch is greater than the first preset epoch; Step 2: determining a node model corresponding to a second predetermined number of data nodes from all the data nodes; Step 3: calculating the mean value of the distribution of class features and the quantity ratio corresponding to each data node, and calculating the distribution weighted aggregation model corresponding to each data node based on the node model, the mean value of the distribution of class features and the quantity ratio corresponding to each data node; Step 4: updating the node model corresponding to each data node by using the distribution weighted aggregation model corresponding to each data node; Step 5: calculating the regularization term corresponding to each data node based on the node model and the distribution weighted aggregation model corresponding to each data node; Step 6: calculating a variance of the distribution of the class features corresponding to each data node, and calculating a class balanced complementary term corresponding to each data node by using a cross-domain feature generator corresponding to each data node based on the mean value of the distribution of the class features and the variance of the distribution of the class features corresponding to each data node; Step 7: obtaining generator data corresponding to the cross-domain feature generator corresponding to each data node, updating the node model corresponding to each data node by using a model optimization formula based on the node data and the generator data corresponding to each data node, and updating the current epoch with the value of the current epoch plus one, performing Step 2 when the current epoch is smaller than or equal to the first preset epoch, and performing Step 8 when the current epoch is greater than the first preset epoch, where the number of epochs to update the node model corresponding to each data node is a second preset epoch; and Step 8: updating the cross-domain feature generator corresponding to each data node according to the generator optimization formula, and ending the loop.

The above scheme can be understood as: Step 1 is for globally updating the judgment conditions, Step 2 is for locally updating the judgment conditions, Step 3 is for calculating the distribution weighted aggregation model, Step 4 is for updating the node model by using the distribution weighted aggregation model, Step 5 for calculating the regularization term, Step 6 is for calculating the class balanced complementary term, Step 7 is to determine whether the node model update is finished, and Step 8 is to update the cross-domain feature generator.

The model optimization formula includes:

$$\theta_i^{(t+1)} = \theta_i^{(t+1)} - \eta \nabla_{\theta_i^{(t+1)}} J(\theta_i^{(t+1)})$$

$$J(\theta_i^{(t+1)}) = L_i(\theta_i^{(t+1)}) + \alpha R(\theta_i^{(t+1)}) + \beta G(\theta_i^{P(t+1)}) =$$

$$\frac{1}{n_i}\sum_{j=1}^{n_i} l_i\left(f_P\left(f_E\left(x_i^j, \theta_i^{E(t+1)}\right), \theta_i^{P(t+1)}\right), y_i^j\right) + \frac{\alpha}{2}\left\|\theta_i^{(t+1)} - \theta_i^{(t)}\right\| +$$

$$\beta \hat{E}_{y\sim\hat{p}(y)} \frac{1}{K}\sum_{i=1}^{K} E_{z\sim G_\psi(z|y), \xi\sim N(\mu_i^y, \sigma_i^y)}\left[l_i\left(f_P\left(z, \theta_i^{P(t+1)}\right), y\right)\right]$$

$$L_i(\theta_i) = \frac{1}{n_i}\sum_{j=1}^{n_i} l_i(x_i^j, y_i^j, \theta_i) = \frac{1}{n_i}\sum_{j=1}^{n_i} l_i\left(f_P\left(f_E\left(x_i^j, \theta_i^E\right), \theta_i^P\right), y_i^j\right)$$

where, $\theta_i^{(t+1)}$ is the node model in the t+1st update corresponding to the ith data node, $\theta_i^{(t)}$ is the node model in the tth update corresponding to the ith data node, $\eta$ is a learning rate of the node model, $\nabla_{\theta_i^{(t+1)}} J(\theta_i^{(t+1)})$ is a derivative of $\theta_i^{(t+1)}$ with respect to $J(\theta_i^{(t+1)})$, $L_i(\theta_i^{(t+1)})$ is an optimization function with respect to $\theta_i^{(t+1)}$, $R(\theta_i^{(t+1)})$ is the regularization term corresponding to the ith data node in the t+1st update, $G(\theta_i^{P(t+1)})$ is the class balanced complementary term in the t+1st update corresponding to the ith data node, $\alpha$ is the learning rate of the cross-domain feature generator, $n_i$ is all the sample data the ith node model has, $f_E(\ )$ and $f_P(\ )$ are respectively the functions corresponding to the feature extraction module $f_E$ and the prediction module $f_P$ of the node model, the functions $\theta_i^{E(t+1)}$ and $\theta_i^{P(t+1)}$ are respectively parameters of the feature extraction module $f_E$ and the prediction module $f_P$ in the t+1st update corresponding to the ith data node, K is a first predetermined number, z is the eigenvector of the input vector of data nodes other than the ith data node, y is an output vector of data nodes other than the ith data node, $l_i(\ )$ is a loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, $x_i^j$ is the input vector of the jth sample data for the ith data node, $y_i^j$ is the output vector of the jth sample data for the ith data node, $y\sim\hat{p}(y)$ denotes that y satisfies $\hat{p}(y)$ distribution, $z\sim G_\psi(z|y), \xi\sim N(\mu_i^y,\sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample includes an eigenvector z and an output vector y, $\beta$ is a hyper-parameter of the the cross-domain feature generator, and B denotes the proportion of $G(\theta_i^{P(t+1)})$ in $J(\theta_i^{(t+1)})$.

The generator optimization formula is:

$$\min_\psi J(\psi) = E_{y\sim\hat{p}(y)} \frac{1}{K}\sum_{i=1}^{K} E_{z\sim G(z|y), \xi\sim N(\mu_i^y, \sigma_i^y)}\left[l_i\left(h\left(f_P\left(z, \theta_i^P\right), y\right)\right)\right]$$

where $J(\psi)$ is the generator, $h(\ )$ is a nonlinear activation function, z is the eigenvector of the input vectors of the data nodes other than the ith data node, y is the output vector of the data nodes other than the ith data node, $l_i(\ )$ is the loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, K is a first predetermined number, $\theta_i^P$ is the model parameter corresponding to prediction module $f_P$ of the ith node model, $f_P(\ )$ is the function corresponding to prediction module $f_P$ of the node model, $y\sim\hat{p}(y)$ denotes that y satisfies $\hat{p}(y)$ distribution, $z\sim G(z|y), \xi\sim N(\mu_i^y,\sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample includes an eigenvector z and an output vector y.

It is to be noted that the generator optimization formula can be derived from the following formula:

the optimization objective corresponding to the generator is $$G^*: G^* = \operatorname*{argmin}_{G:Y\to Z} E_{y\sim\hat{p}(y)} E_{z\sim G(z|y)}\left[\sum_{i=1}^{K}\log(P(y\mid z; \theta_i^P))\right];$$

$$\text{where, } \hat{p}(y) \propto \sum_{i\in[k]} E_{(x,y)\sim D_i^*}[1(y)];$$

or empirical loss optimization objective $J(\psi)$:

$$\min_\psi J(\psi) = E_{y\sim\hat{p}(y)} \frac{1}{K}\sum_{i=1}^{K} E_{z\sim G(z|y), \xi\sim N(\mu_i^y, \sigma_i^y)}\left[l_i\left(h\left(f_P\left(z, \theta_i^P\right), y\right)\right)\right]$$

The difference between the empirical loss optimization objective and the optimization objective is that the corresponding loss functions of the two are not the same, because the empirical loss optimization objective and the optimization objective are both general concepts in the field, so they will not be repeated here. The characters in the embodiments of the present application are explained in other embodiments and will not be repeated.

In order to better understand the above technical solutions, embodiments of the present application also provide an optional embodiment for explaining and illustrating the above technical solutions.

Figure 2:
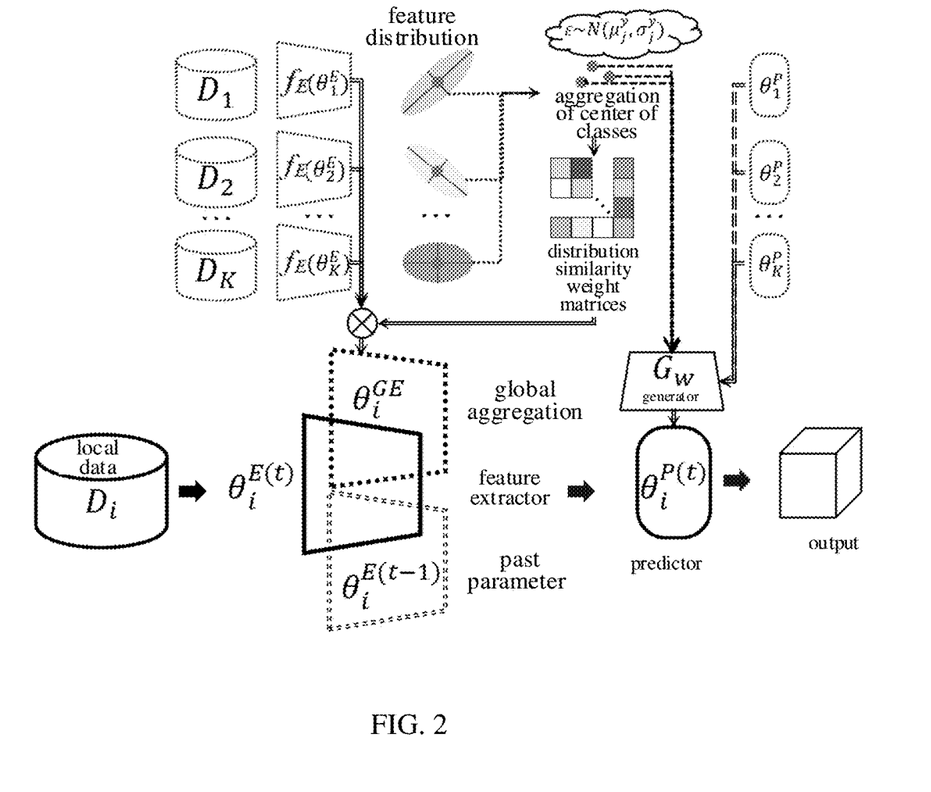
FIG. 2 schematically illustrates a schematic diagram of calculating the amount of updates to a node model according to an embodiment of this application.

FIG. 2 schematically illustrates a schematic diagram of calculating the amount of updates to a node model according to an embodiment of this application, as follows:

extracting, by the feature extraction module $f_E$ and the prediction module $f_P$, the ith node model from the training dataset $D_i$, the model parameters corresponding to the feature extraction module $f_E$ and the prediction module $f_P$ of the ith node model are $\theta_i^E$ and $\theta_i^P$, respectively. For example, in FIG. 2, $f_E(\theta_1^E)$ denotes the ith node model from the training dataset $D_1$. In the feature extraction module $f_E$ the corresponding model parameter of the feature extraction module $f_E$ of the first node model is $\theta_1^E$;

calculating the distribution weighted aggregation model $\theta_i^{GE}$ based on the model parameters extracted by the feature extraction module $f_E$ and the distribution similarity weight matrices, where the distribution weighted aggregation model is a global aggregation, and the global aggregation includes an aggregation of the past parameter $\theta_j^{E(t-1)}$. In the embodiment of this application embodiment, E corresponds to the feature extraction module, P corresponds to the prediction module, t denotes the moment, t−1 denotes the past moment, and t denotes the current moment;

extracting, by a feature extractor, distribution weighted features of the distribution weighted aggregation model;

obtaining the generated features, by the generator $G_W$, based on $\xi \sim N(\mu_j^y, \sigma_j^y)$ distribution and the model parameters extracted by the prediction module $f_P$, where the generators in this application all refer to cross-domain feature generators;

outputting the update amount of the node model based on the distribution weighted features and generative features, and updating the node model through the predictor and, where the predictor is the prediction module $f_P$.

In this application, obtaining a node model corresponding to a data node; calculating a mean value of the distribution of class features and a quantity ratio corresponding to training data of the data node, and calculating a distribution weighted aggregation model based on the node model, the mean value of the distribution of class features and the quantity ratio; calculating a regularization term corresponding to the data node based on the node model and the distribution weighted aggregation model; calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features; updating the node model based on the distribution weighted aggregation model, the regularization term, and the class balanced complementary term.

Since the embodiments of the this application can compute the distribution weighted aggregation model, the regularization term, and the class balanced complementary term, and update the node model based on the distribution weighted aggregation model, the regularization term, and the class balanced complementary term, the problem of the lack of a solution to address the propagation of discrimination in federated learning in the prior art can be solved by adopting the above technical means.

By the above description of the embodiments, it is clear to those skilled in the art that the method according to the above embodiments may be implemented with the aid of software plus the necessary general-purpose hardware platform, or of course by means of hardware, but in many cases the former is the preferred embodiment. Based on this understanding, the technical solution of the present application may be embodied essentially or in part as a contribution to the prior art in the form of a software product, where the computer software product is stored in a storage medium (e.g., read-only memory (ROM), random access memory (RAM), diskette, CD-ROM), which includes a number of instructions to make a terminal device (which may be a mobile phone, a component server, or a network device, etc.) to execute the method in various embodiments of the present application.

Also provided in this embodiment is an apparatus for updating a node model that resists discrimination propagation in federated learning, the apparatus for updating a node model is used to implement the above embodiments and preferred embodiments, which will not be repeated where descriptions have already been made. As used below, the term "module" may be a combination of software and/or hardware that implements a predetermined function. Although the devices described in the following embodiments are preferably implemented in software, implementations in hardware, or combinations of software and hardware, are also possible and contemplated.

Figure 3:
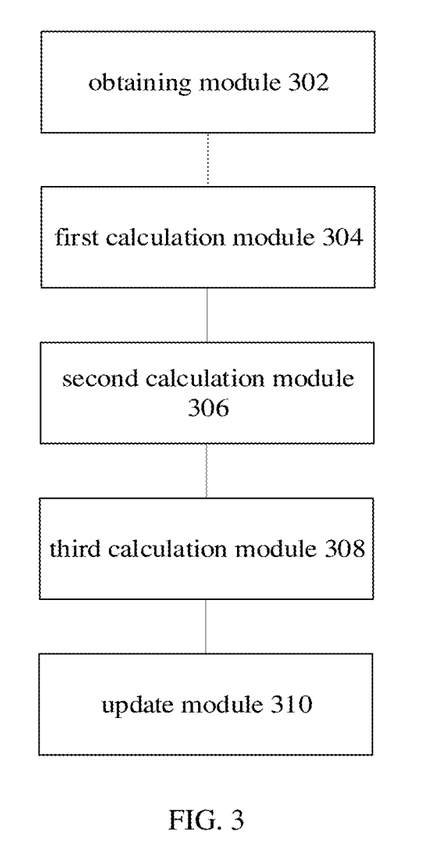
FIG. 3 schematically illustrates a block diagram of the structure of an apparatus for updating a node model that resists discrimination propagation in federated learning according to embodiment of this application.

FIG. 3 schematically illustrates a block diagram of the structure of an apparatus for updating a node model that resists discrimination propagation in federated learning according to embodiment of this application. As shown in FIG. 3, the apparatus includes:

an obtaining module 302, configured for obtaining a node model corresponding to a data node;

a first calculation module 304, configured for calculating a mean value of the distribution of class features and a quantity ratio corresponding to training data of the data node, and calculating a distribution weighted aggregation model based on the node model, the mean value of the distribution of class features and the quantity ratio;

a second calculation module 306, configured for calculating a regularization term corresponding to the data node based on the node model and the distribution weighted aggregation model;

a third calculation module 308, configured for calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features;

an update module 310, configured for updating the node model based on the distribution weighted aggregation model, the regularization term, and the class balanced complementary term.

Since the embodiments of the this application can compute the distribution weighted aggregation model, the regularization term, and the class balanced complementary term, and update the node model based on the distribution weighted aggregation model, the regularization term, and the class balanced complementary term, the problem of the lack of a solution to address the propagation of discrimination in federated learning in the prior art can be solved by adopting the above technical means.

It should be noted that the aforementioned modules can be implemented using software or hardware, and for the latter, it can be implemented by, but not limited to, the following: all of the above modules are located in the same processor; or, each of the above modules is located in different processors respectively in the form of any combination.

Embodiments of the present application provide an electronic device.

Figure 4:
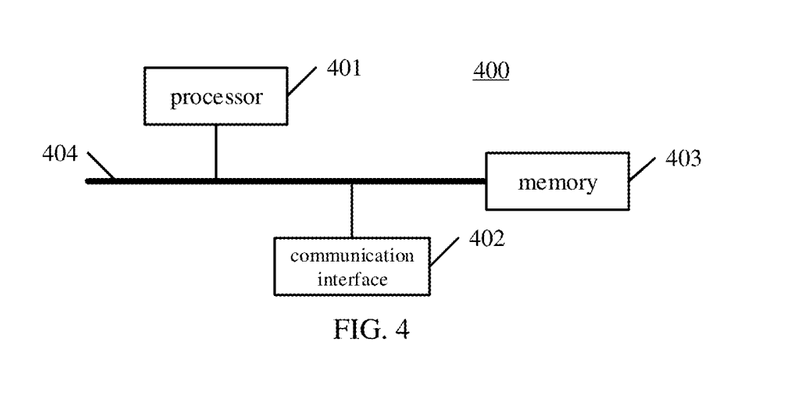
FIG. 4 schematically illustrates a block diagram of the structure of an electronic device provided by an embodiment of this application.

FIG. 4 schematically illustrates a block diagram of the structure of an electronic device provided by an embodiment this application.

Referring to FIG. 4, the electronic device 400 provided by embodiments of the present application includes a processor 401, a communication interface 402, a memory 403, and a communication bus 404, where the processor 401, the communication interface 402, and the memory 403 communicate with each other via the communication bus 404; the memory 403 is configured for storing a computer program; and the processor 401 is configured for implementing the steps in any of the above embodiments of the method when executing the program stored on the memory.

Optionally, the electronic device may further include a transmission device as well as an input-output device, wherein the input-output device is connected to the processor.

Optionally, in this embodiment, the processor may be set to perform the following steps via a computer program:
S1, obtaining a node model corresponding to a data node;
S2, calculating a mean value of the distribution of class features and a quantity ratio corresponding to training data of the data node, and calculating a distribution weighted aggregation model based on the node model, the mean value of the distribution of class features and the quantity ratio;
S3, calculating a regularization term corresponding to the data node based on the node model and the distribution weighted aggregation mode;
S4, calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features;
S5, updating the node model based on the distribution weighted aggregation model, the regularization term, and the class balanced complementary term.

Embodiments of the present application also provide a computer-readable storage medium. A computer program is stored on the computer-readable storage medium, where the computer program are executed by a processor to implement the steps in any of the above method embodiments.

Optionally, in this embodiment, the storage medium may be provided to store a computer program to perform the following steps:
S1, obtaining a node model corresponding to a data node;
S2, calculating a mean value of the distribution of class features and a quantity ratio corresponding to training data of the data node, and calculating a distribution weighted aggregation model based on the node model, the mean value of the distribution of class features and the quantity ratio;
S3, calculating a regularization term corresponding to the data node based on the node model and the distribution weighted aggregation mode;
S4, calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features;
S5, updating the node model based on the distribution weighted aggregation model, the regularization term, and the class balanced complementary term.

The computer-readable storage medium may be contained in the device/apparatus described in the above embodiments; or it may stand alone and not be assembled into the device/apparatus. The computer-readable storage medium carries one or more programs, and when the one or more programs are executed, the method according to embodiments of the present application is implemented.

According to embodiments of the present application, the computer-readable storage medium may be a non-volatile computer-readable storage medium, which may include, for example, but is not limited to: a portable computer disk, a hard disk, a random access memory (RAM), a read-only memory (ROM), an erasable programmable read-only memory (EPROM or flash memory), a portable compact disk read-only memory (CD-ROM), an optical storage devices, magnetic storage devices, or any suitable combination of the above. In this application, a computer-readable storage medium may be any tangible medium that contains or stores a program that may be used by or in combination with an instruction execution system, apparatus, or device.

Optionally, specific examples in this embodiment can be referred to in the examples described in the above embodiments and optional embodiments, which are not repeated herein.

Clearly, it should be appreciated by those skilled in the art that the modules or steps of the present application described above can be implemented with a general-purpose computing device, that they can be clustered on a single computing device or distributed on a network including a plurality of computing devices, that, optionally, they can be implemented with program code that is executable by the computing device, and thus, that they can be stored in a storage device to be executed by the computing device, and that the steps shown or described herein can be implemented in a different order than they are shown or described herein. And, in some cases, the steps shown or described may be executed in a different order than herein, either by making them into individual integrated circuit modules separately, or by making multiple modules or steps of them into a single integrated circuit module. In this way, the present application is not limited to any particular combination of hardware and software.

The above descriptions are only preferred embodiments of the present application and are not intended to limit the present application, which is subject to various changes and variations for those skilled in the art. Any modification, equivalent replacement, improvement, etc., made within the spirit and principle of the present application shall be included within the scope of protection of the present application.

What is claimed is:

1. A method for updating a node model that resists discrimination propagation in federated learning, comprising:

obtaining a node model corresponding to a data node;
calculating a mean value of the distribution of class features and a quantity ratio corresponding to training data of the data node, and calculating a distribution weighted aggregation model based on the node model, the mean value of the distribution of class features and the quantity ratio;
calculating a regularization term corresponding to the data node based on the node model and the distribution weighted aggregation model;
calculating a variance of the distribution of the class features corresponding to the data node, and calculating a class balanced complementary term corresponding to a desired feature distribution level for the data node by using a cross-domain feature generator based on the mean value of the distribution of class features and the variance of the distribution of the class features;
updating the node model based on the distribution weighted aggregation model, the regularization term, and the class balanced complementary term;
wherein calculating the distribution weighted aggregation model based on the node model, the mean value of the distribution of class features and the quantity ratio comprises:
calculating distribution similarity distances between the data node and other data nodes correspondingly based on the mean value of the distribution of class features and the quantity ratio;
selecting a first predetermined number of node models from a plurality of node models corresponding to a plurality of data nodes, and calculating a distribution weighted aggregation model based on the distribution similarity distances and the first predetermined number of node models;
wherein calculating the regularization term corresponding to the data node based on the node model and the distribution weighted aggregation model comprises:
calculating the regularization term corresponding to the ith data node in the t+1st update by the following formula, $$\theta_i^{(t+1)} = \theta_i^G;$$

$$R(\theta_i^{(t+1)}) = \frac{1}{2}\|\theta_i^{(t+1)} - \theta_i^{(t)}\|;$$

wherein, $\theta_i^G$ is the distribution weighted aggregation model corresponding to the ith data node, $\theta_i^{(t+1)}$ is the node model in the t+1st update corresponding to the ith data node, $\theta_i^{(t)}$ is the node model in the tth update corresponding to the ith data node, $\|\ \|$ denotes the two-norm operation;

wherein calculating the class balanced complementary term corresponding to the data node by using the cross-domain feature generator based on the mean value of the distribution of class features and the variance of the distribution of the class features comprises:
calculating the class balanced complementary term $G(\theta_i^P)$ corresponding to the ith data node by the following formula, $$G(\theta_i^P) = \hat{E}_{y\sim\hat{p}(y)} \frac{1}{K} \sum_{i=1}^{K} E_{z\sim G_\Psi(z|y,\xi\sim N(\mu_i^y,\sigma_i^y))}[l_i(f_P(z,\theta_i^P),y)]$$

wherein z is the eigenvector of the input vectors of the data nodes other than the ith data node, y is the output vectors of the data nodes other than the ith data node, $l_i(\ )$ is the loss function corresponding to the node model of the ith data node, $\mu_i^y$ is the mean value of the distribution of class features of the ith data node with respect to the output vector y, $\sigma_i^y$ is the variance of the class feature distribution of the ith data node with respect to the output vector y, K is a first predetermined number, $\theta_i^P$ is the model parameter corresponding to the prediction module fP of the model of the ith node, fP( ) is the function corresponding to the prediction module fP of the node model, $y\sim\hat{p}(y)$ denotes that y satisfies $\hat{p}(y)$ distribution, $z\sim G_\Psi(z|y)$, $\xi\sim N(\mu_i^y,\sigma_i^y))$ denotes that Z satisfies $G_\Psi(\ )$ distribution, N( ) is a normal distribution, E[ ] denotes the actual mean value when the data point samples conform to the true distribution, $\hat{E}$ denotes that the estimated mean value calculated from some of the data point samples, $\varepsilon$ is a parameter of the cross-domain feature generator, and the data point samples comprises an eigenvector z and an output vector y.

2. The method according to claim 1, wherein calculating the mean value of the distribution of class features, the quantity ratio and the variance of the distribution of the class features corresponding to the data node, comprises:

$$\mu_i^c = \frac{\sum_{(x_i^j, y_i^j) \in D_i, y_i^j = c} f(x_i^j, \theta_i^E)}{\sum_{(x_i^j, y_i^j) \in D_i} 1(y_i^j = c)}$$

$$\omega_i^c = \frac{\sum_{(x_i^j, y_i^j) \in D_i} 1(y_i^j = c)}{n_i}$$

$$\sigma_i^c = \frac{1}{n_i - 1} \sum_{(x_i^j, y_i^j) \in D_i, y_i^j = c} (x_i^j - \mu_i^c)^T (x_i^j - \mu_i^c)$$

wherein, $\mu_i^c$ is the mean value of the distribution of class features, $\omega_i^c$ is the quantity ratio, and $\sigma_i^c$ is the variance of the distribution of the class features, i is a serial number of the data node, j is a serial number of a class of sample data of the data node, the node model comprises: a feature extraction module $f_E$ and a prediction module $f_P$, the corresponding model parameters of the feature extraction module $f_E$ and the prediction module $f_P$ of the ith node model are $\theta_i^E$ and $\theta_i^P$ respectively, $x_i^j$ is an input vector of the jth sample data for the ith data node, $y_i^j$ is an output vector of the jth sample data of the ith data node, f( ) is a function corresponding to the node model, l( ) is a loss function corresponding to the node model, $n_i$ is all the sample data the ith node model has, and T denotes a total number of training epochs, $D_i$ is the training dataset for node i, $y_i^j = c$ indicates that the selected sample data all belongs to the data under sample class c, and the sample data has a plurality of sample classes.

3. The method according to claim 1, wherein calculating the distribution similarity distances corresponding to the data node based on the mean value of the distribution of class features and the quantity ratio comprises:

defining $d_{ij}=\|\mu_P^i-\mu_Q^j\|$ as the distance from the ith sample data of data node P to the jth sample data of data node Q;

defining $f_{ij}$ conforming to the following formulas:

$$\min \sum_{i=1}^{n_P}\sum_{j=1}^{n_Q} d_{ij}f_{ij};$$

$$f_{ij} \geq 0, \sum_{i=1}^{n_P} f_{ij} \leq \omega_Q^j, \sum_{j=1}^{n_Q} f_{ij} \leq \omega_P^i;$$

$$\sum_{i=1}^{n_P}\sum_{j=1}^{n_Q} f_{ij} = \min\left\{\sum_{i=1}^{n_P}\omega_P^i, \sum_{j=1}^{n_Q}\omega_Q^j\right\};$$

calculating the distribution similarity distance $EMD_{PQ}$ from the ith sample data of data node P to the jth sample data of data node Q by the following formula:

$$EMD_{PQ} = \frac{\sum_{i=1}^{n_P}\sum_{j=1}^{n_Q} d_{ij}f_{ij}}{\sum_{i=1}^{n_P}\sum_{j=1}^{n_Q} f_{ij}};$$

wherein, $n_P$ and $n_Q$ are all the sample data the Pth data node and the Qth data node have respectively, $\omega_Q^j$ is the quantity ratio of the jth sample data of the Qth data node, $\omega_P^i$ is the quantity ratio of the ith sample data of the Pth data node, $\mu_P^i$ is the mean value of the distribution of the class features of the ith sample data of the Pth data node, $\mu_Q^j$ is the mean value of the distribution of class features of the jth sample data of the Qth data node, $\|\ \|$ denotes the two-norm operation.

4. The method according to claim 1, wherein selecting the first predetermined number of node models from the plurality of node models corresponding to the plurality of data nodes, and calculating the distribution weighted aggregation model based on the distribution similarity distances and the first predetermined number of node models, comprises:

calculating the distribution weighted aggregation model $\theta_i^G$ corresponding to the ith data node is computed by the following formula:

$$\theta_i^G = \lambda\theta_i + (1-\lambda)\sum_{j\in[K], j\neq i} \frac{EMD_{ji}}{\sum_{j\in[K], j\neq i} EMD_{ji}}\theta_j;$$

wherein, $\lambda$ is a constant, $\theta_i$ is the model parameter corresponding to the ith node model, $\theta_j$ is the model parameter corresponding to the jth node model, $EMD_{ji}$ is the distribution similarity distances corresponding to the ith data node and the jth data node, and K is the first predetermined number.

5. The method according to claim 1, after obtaining the node model corresponding to the data node, further comprising:

initializing all the node models and confirming the node data corresponding to each data node, executing the following cycle:

step 1: determining a current epoch, and executing Step 2 when the current epoch is smaller than or equal to a first preset epoch, and executing Step 8 when the current epoch is greater than the first preset epoch;

step 2: determining a node model corresponding to a second predetermined number of data nodes from all the data nodes;

step 3: calculating the mean value of the distribution of class features and the quantity ratio corresponding to each data node, and calculating the distribution weighted aggregation model corresponding to each data node based on the node model, the mean value of the distribution of class features and the quantity ratio corresponding to each data node;

step 4: updating the node model corresponding to each data node by using the distribution weighted aggregation model corresponding to each data node;

step 5: calculating the regularization term corresponding to each data node based on the node model and the distribution weighted aggregation model corresponding to each data node;

step 6: calculating a variance of the distribution of the class features corresponding to each data node, and calculating a class balanced complementary term corresponding to each data node by using a cross-domain feature generator corresponding to each data node based on the mean value of the distribution of the class features and the variance of the distribution of the class features corresponding to each data node;

step 7: obtaining generator data corresponding to the cross-domain feature generator corresponding to each data node, updating the node model corresponding to each data node by using a model optimization formula based on the node data and the generator data corresponding to each data node, and updating the current epoch with the value of the current epoch plus one, performing Step 2 when the current epoch is smaller than or equal to the first preset epoch, and performing Step 8 when the current epoch is greater than the first preset epoch, wherein the number of epochs to update the node model corresponding to each data node is a second preset epoch; and step 8: updating the cross-domain feature generator corresponding to each data node according to the generator optimization formula, and ending the loop.

6. The method according to claim 5, wherein, the model optimization formula comprises:

$$\theta_i^{(t+1)} = \theta_i^{(t+1)} - \eta\nabla_{\theta_i^{(t+1)}} J(\theta_i^{(t+1)})$$

$$J(\theta_i^{(t+1)}) = L_i(\theta_i^{(t+1)}) + \alpha R(\theta_i^{(t+1)}) + \beta G(\theta_i^{P(t+1)}) =$$

$$\frac{1}{n_i}\sum_{j=1}^{n_i} l_i(f_P(f_E(x_i^j, \theta_i^{E(t+1)}), \theta_i^{P(t+1)}), y_i^j) + \frac{\alpha}{2}\|\theta_i^{(t+1)} - \theta_i^{(t)}\| +$$

$$\beta\hat{E}_{y\sim\hat{p}(y)}\frac{1}{K}\sum_{i=1}^{K} E_{z\sim G_\psi(z|y), \zeta\sim N(\mu_i^y, \sigma_i^y)}[l_i(f_P(z, \theta_i^{P(t+1)}), y)]$$

$$L_i(\theta_i) = \frac{1}{n_i}\sum_{j=1}^{n_i} l_i(x_i^j, y_i^j, \theta_i) = \frac{1}{n_i}\sum_{j=1}^{n_i} l_i(f_P(f_E(x_i^j, \theta_i^E), \theta_i^P), y_i^j)$$

wherein, $\theta_i^{(t+1)}$ is the node model in the t+1st update corresponding to the ith data node, $\theta_i^{(t)}$ is the node model in the tth update corresponding to the ith data node, $\eta$ is a learning rate of the node model, $\nabla_{\theta_i^{(t+1)}} J(\theta_i^{(t+1)})$ is a derivative of $\theta_i^{(t+1)}$ with respect to $J(\theta_i^{(t+1)})$, $L_i(\theta_i^{(t+1)})$ is an optimization function with respect to $\theta_i^{(t+1)}$, $R(\theta_i^{(t+1)})$ is the regularization term corresponding to the ith data node in the t+1st update, $G(\theta_i^{P(t+1)})$ is the class balanced complementary term in the t+1st update corresponding to the ith data node, $\alpha$ is the learning rate of the cross-domain feature generator, $n_i$ is all the sample data the ith node model has, $f_E(\ )$ and $f_P(\ )$ are respectively the functions corresponding to the feature extraction module $f_E$ and the prediction module $f_P$ of the node model, the functions $\theta_i^{E(t+1)}$ and $\theta_i^{P(t+1)}$ are respectively parameters of the feature extraction module $f_E$ and the prediction module $f_P$ in the t+1st update corresponding to the ith data node, K is a first predetermined number, z is the eigenvector of the input vector of data nodes other than the ith data node, y is an output vector of data nodes other than the ith data node, $l_i(\ )$ is a loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, $x_i^j$ is the input vector of the jth sample data for the ith data node, $y_i^j$ is the output vector of the jth sample data for the ith data node, $y \sim \hat{p}(y)$ denotes that y satisfies $\hat{p}(y)$ distribution, $z \sim G_\psi(z|y, \xi \sim N(\mu_i^y, \sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample comprises an eigenvector z and an output vector y, and $\beta$ is a hyperparameter of the cross-domain feature generator.

7. The method according to claim 5, wherein, the generator optimization formula is:

$$\min_\psi J(\psi) = E_{y \sim \hat{p}(y)} \frac{1}{K} \sum_{i=1}^{K} E_{z \sim G(z|y, \xi \sim N(\mu_i^y, \sigma_i^y))} [l_i(h(f_P(z, \theta_i^P), y))]$$

wherein $J(\psi)$ is the generator, $h(\ )$ is a nonlinear activation function, z is the eigenvector of the input vectors of the data nodes other than the ith data node, y is the output vector of the data nodes other than the ith data node, $l_i(\ )$ is the loss function corresponding to the node model of the ith data node, $\mu_i^y$ is the mean value of the class feature distribution of the ith data node with respect to the output vector y, $\sigma_i^y$ is the variance of the class feature distribution of the ith data node with respect to the output vector y, K is a first predetermined number, $\theta_i^P$ is the model parameter corresponding to prediction module $f_P$ of the ith node model, $f_P(\ )$ is the function corresponding to prediction module $f_P$ of the node model, $y \sim \hat{p}(y)$ denotes that y satisfies $\hat{p}(y)$ distribution, $z \sim G(z|y, \xi \sim N(\mu_i^y, \sigma_i^y))$ denotes that Z satisfies $G_\psi(\ )$ distribution, $N(\ )$ is a normal distribution, $E[\ ]$ denotes the actual mean value when the data point samples conform to the true distribution, $\hat{E}$ denotes the estimated mean value calculated from some of the data point samples, $\varepsilon$ is a parameter of the cross-domain feature generator, the data point sample comprises an eigenvector z and an output vector y.

\* \* \* \* \*